(12) United States Patent
Bagg

(10) Patent No.: US 12,134,457 B2
(45) Date of Patent: Nov. 5, 2024

(54) CONFIGURABLE BUOYANCY AND GEOMETRY (CBAG) AIRSHIP

(71) Applicant: Charles G Bagg, Leominster, MA (US)

(72) Inventor: Charles G Bagg, Leominster, MA (US)

( * ) Notice: Subject to any disclaimer, the term of this patent is extended or adjusted under 35 U.S.C. 154(b) by 0 days.

(21) Appl. No.: 17/806,160

(22) Filed: Jun. 9, 2022

(65) Prior Publication Data
US 2023/0399093 A1    Dec. 14, 2023

(51) Int. Cl.
*B64B 1/62* (2006.01)
*B64B 1/08* (2006.01)

(52) U.S. Cl.
CPC ............... *B64B 1/62* (2013.01); *B64B 1/08* (2013.01); *B64B 2201/00* (2013.01)

(58) Field of Classification Search
CPC .......... B64B 1/08; B64B 1/62; B64B 2201/00
See application file for complete search history.

(56) References Cited

U.S. PATENT DOCUMENTS

| | | | | |
|---|---|---|---|---|
| 4,838,501 A | * | 6/1989 | Judson | B64C 37/02 244/30 |
| 6,793,180 B2 | * | 9/2004 | Nachbar | B64B 1/58 244/128 |
| 9,828,081 B1 | * | 11/2017 | DeVaul | B64B 1/44 |
| 10,843,783 B1 | * | 11/2020 | Cranston | B64B 1/62 |

FOREIGN PATENT DOCUMENTS

| | | | | |
|---|---|---|---|---|
| AU | 2021102211 A4 | * | 6/2021 | |
| CA | 2557771 A1 | * | 2/2008 | B60V 3/08 |
| WO | WO-2012123793 A1 | * | 9/2012 | B64B 1/04 |
| WO | WO-2014096559 A1 | * | 6/2014 | B64B 1/06 |

OTHER PUBLICATIONS

Machine Translation of WO-2012123793-A1, Bernard A, Sep. 2012 (Year: 2012).*
Machine Translation of WO-2014096559-A1, Geneste J, Jun. 2014 (Year: 2014).*

* cited by examiner

*Primary Examiner* — Tien Q Dinh
*Assistant Examiner* — Katherine June Bolek

(57) ABSTRACT

A lighter-than-air semi-rigid airship has Configurable Buoyancy And Geometry (CBAG) allowing it to become short and plump for high buoyancy during takeoff and landing, but also allowing it to become long and slim for reduced drag (albeit less buoyancy) so that it may travel at high speed. It may be combined with a heavier-than-air structure having wings or rotors to form a hybrid aircraft whereby the wings or rotors provide enough lift to compensate for the reduced buoyancy during high-speed flight.

6 Claims, 5 Drawing Sheets

CONFIGURABLE BUOYANCY AND GEOMETRY (CBAG) AIRSHIP

CROSS REFERENCE TO RELATED PATENTS

Not Applicable

STATEMENT OF FEDERALLY SPONSORED RESEARCH

Not Applicable

PARTIES TO A JOINT RESEARCH AGREEMENT

Not Applicable

REFERENCE TO A SEQUENCE LISTING, TABLE, OR COMPUTER PROGRAM

Not Applicable

BACKGROUND OF THE INVENTION

Lighter-than-air airships use a buoyant gas—most commonly helium, hydrogen, or hot air—to provide lift, and may be classed as non-rigid, semi-rigid, or rigid. Non-rigid airships such as early blimps and hot air balloons have an envelope that is supported only by the pressure of the gas within. Semi-rigid airships typically have some internal structure but still rely on internal pressure to inflate the envelope. Rigid airships such as dirigibles have a mechanical structure that supports and maintains the shape of the outer envelope while the lifting gas is typically contained in multiple smaller internal gas chambers.

Lighter-than-air airships are useful because they can take off and land vertically and can stay aloft for long periods using little or no fuel unless they use hot air as the lifting gas. However, they do have some serious disadvantages. They are limited to low speeds because they have a very large frontal area with a rather delicate outer skin. The newest blimps have a maximum speed of about 70 MPH. Lighter-than-air airships tend to be very expensive if they use helium, and very dangerous if they use hydrogen, which is much cheaper but highly flammable. Another problem is that in order to land, an airship must be slightly heavier than air, or use its engines to produce some downward force. Once on the ground, it typically needs to be tethered to keep it down or brought into a hangar to protect it from the wind. At high altitude, where the atmospheric pressure is reduced, the internal gas may develop too much differential pressure if it is not vented or pumped into a pressure tank. Some airships are designed to be slightly heavier than air and must use their engines to take off and stay airborne.

In 1670, an airship was proposed using vacuum filled spheres for buoyancy, which initially sounds like a great idea, because a vacuum is lighter than any lifting gas. However, scientists have argued that any physical structure strong enough to support a vacuum against the crush of atmospheric pressure would be too heavy to be lifted by the enclosed vacuum.

BRIEF SUMMARY OF THE INVENTION

The present invention overcomes many, and perhaps all, of the shortcomings of previous lighter-than-air airships. Because it provides Configurable Buoyancy and Geometry, (abbreviated CBAG) it can become significantly lighter or heavier than the air it displaces, enabling vertical takeoff and landing (VTOL) without the need for thrust or ballast. (In this context, the terms diameter, volume, frontal area, and displacement are used do describe aspects of the geometry.) The CBAG airship can also reduce its frontal area and drag to be more streamlined, while at the same time becoming more rugged and durable, allowing it to travel at high speed when combined with a heavier-than-air aircraft to form a hybrid. It is anticipated that such a craft will be able to travel at well over 100 MPH, possibly over 200 MPH. Yet, it has a very simple, inherently strong, lightweight, and low-cost semi-rigid structure and operating mechanism. It requires no ballast, no multiple separate gas chambers, no pumps, pressure tanks, or blowers, and no complex control schemes. In addition, because the envelope is supported by a mechanical structure, the internal gas can be at a partial vacuum, further increasing its buoyancy over that of a similar volume airship in which the gas must be above atmospheric pressure to inflate and support the envelope. This also reduces the problem of excessive internal pressure at high altitude. A further advantage is that if there were any leakage or permeability in the envelope, rather than expensive helium or dangerous hydrogen leaking out, relatively harmless air would leak in, which could be continuously condensed, liquefied, and eliminated by a miniature cryogenic system. The reduced internal pressure and the active elimination of air molecules would help to make a hydrogen-filled airship safe and practical, as the hydrogen cannot ignite or explode without oxygen.

DETAILED DESCRIPTION

Figure 1:
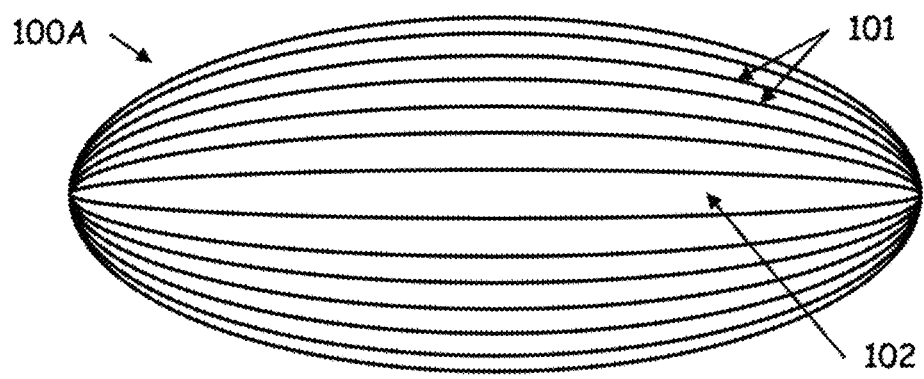
FIG. 1 is a side view of the CBAG airship configured for maximum buoyancy.
Figure 6:
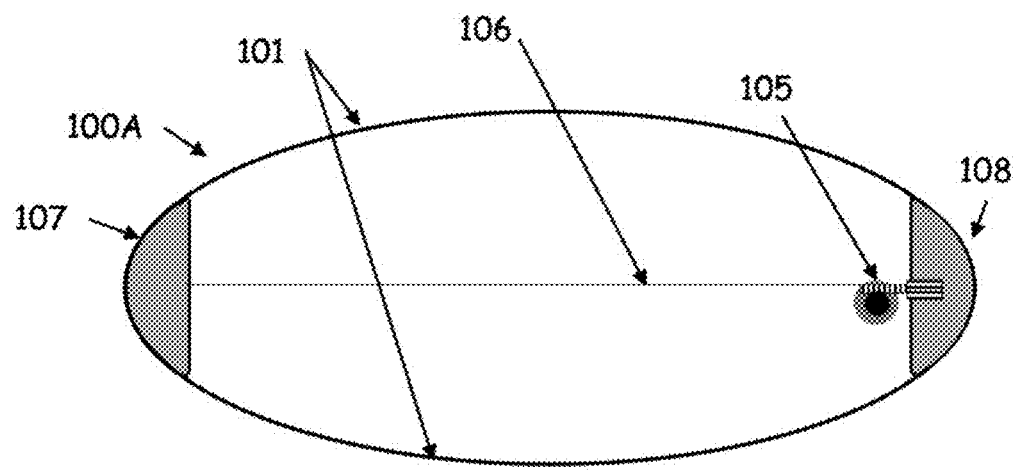
FIG. 6 is a side view showing tensioning mechanism adjusted for maximum buoyancy of the CBAG airship.

FIG. 1 shows the CBAG airship 100A adjusted for maximum buoyancy. A suitable tensioning mechanism 105 as shown in FIG. 6 forces the nose and tail closer together shortening the overall length, forcing the ribs 101 to bow outward, greatly increasing the volume and displacement of the airship, while at the same time reducing the internal gas pressure. This action stretches the envelope 102 tight against the ribs for increased rigidity. For simplicity, the drawings show the overall shape as a symmetrical ellipsoid, but in practice, the shape could be engineered to be more streamlined for improved aerodynamics, or to be otherwise asymmetrical to optimize its utility.

Figure 2:
FIG. 2 is a side view of the CBAG airship configured for minimum buoyancy.

FIG. 2 shows the CBAG airship 100B adjusted for minimum buoyancy. The same tensioning mechanism allows the nose and tail to gradually move farther apart. This action allows the ribs to become less bowed and move inward toward the centerline, partly due to the built-in springiness of the ribs, and partly due to atmospheric pressure pushing on the outside of the envelope against the lower gas pressure inside.

Figure 3:
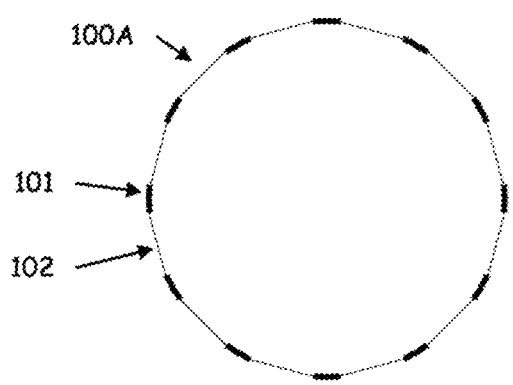
FIG. 3 is a section across the middle of the CBAG airship configured for maximum buoyancy.

FIG. 3 shows a cross section through the middle of the CBAG Airship 100A at maximum diameter and buoyancy, showing the individual ribs 101 separated by wide segments of envelope 102.

Figure 4:
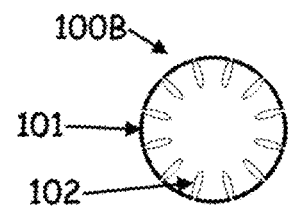
FIG. 4 is a section across the middle of the CBAG airship configured for minimum buoyancy.

FIG. 4 shows the same cross section through the middle of the CBAG Airship 100B configured for minimum diameter and buoyancy, such that the ribs move closer together till they meet, forming a closed hard shell. Atmospheric pressure causes the thin flexible envelope material 102 to neatly fold inward between the ribs as they gradually move closer together.

Figure 5:
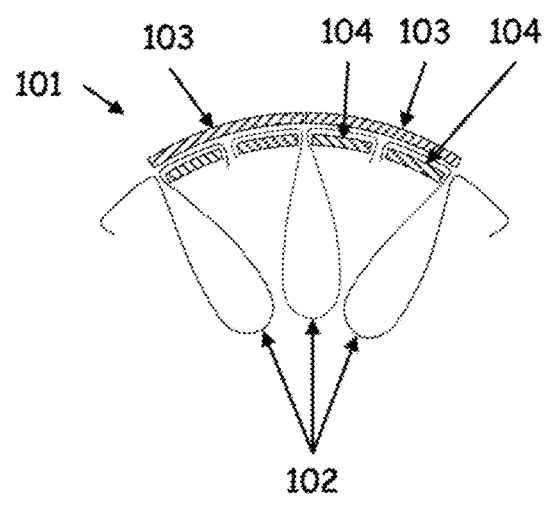
FIG. 5 is a section across the middle of a possible rib structure.

FIG. 5 shows a simplified cross section detail of one possible rib structure and its relationship to the envelope sections. Two rib sections are shown. Each rib 101 includes a wide outer shell 103 and two narrow inner shells 104. The edges of the envelope sections 102 are sandwiched between the inner and outer shells. (The size and spacing is exaggerated for clarity.) The inner and outer shells, and the envelope material could be joined together by adhesive, removable fasteners, or any other appropriate means. This method of assembly would make it unnecessary to have sewn seams in the envelope, reducing cost and weight. The inner shells are made narrower than the outer shells so as not to damage the envelope by pinching it when the outer shells meet. The outer shells could be made with tongue and groove joints or the like to make the structure more ridged. The inner or outer shells could also include longitudinal ridges or other structures for added strength. The ribs could possibly be made of aluminum, but modern composite materials might provide higher strength at less weight, and possibly lower cost.

In the construction of a modern blimp, the entire envelope must be formed into one or two very large pieces before it is applied to the internal structure, which is a very complex and costly process. In the present invention, the rib structure makes it possible to install the envelope one segment at a time in a much simpler and less costly process.

Figure 7:
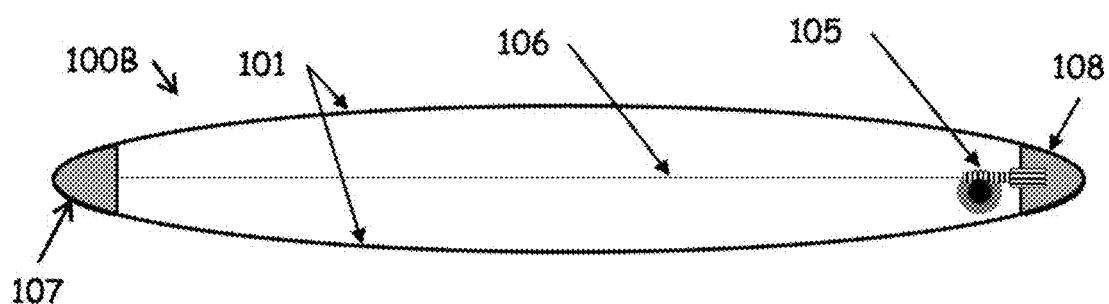
FIG. 7 is a side view showing tensioning mechanism adjusted for minimum buoyancy of the CBAG airship.

As shown in FIGS. 6 and 7, there would be a rugged nose assembly 107 at the front end and a similar tail assembly 108 at the back end to anchor the ribs 101 and keep them properly aligned. The nose and tail assemblies would also serve as anchor points for the tensioning mechanism 105 that pulls on cable 106 to shorten the length of the CBAG airship to increase its buoyancy and geometry. FIG. 6 shows the nose and tail assemblies drawn close together by the tensioning mechanism to maximize the buoyancy and geometry. FIG. 7 shows the nose and tail assemblies allowed to spread further apart by the tensioning mechanism to minimize the buoyancy and geometry. The simplest and lightest tensioning mechanism would probably be an electric powered cable winch mounted inside, but a motorized jackscrew, or a pneumatic or hydraulic cylinder could also be used. Because it only takes a small change in length to produce a large change in diameter and buoyancy, the jackscrew or cylinder would not need to be very long. For example, if the airship were 100 feet long and 10 feet in diameter at minimum buoyancy, it would only have to be shortened by 2½ feet to double its diameter. The tensioning mechanism could be mounted in the nose or tail assembly for easy servicing.

Some of the ribs could be fitted with appropriate means to allow attachment of various external features such as fins, engines, or a suspended gondola, as long as the attached features did not interfere with the normal flexing of the ribs as they change shape. The nose and tail assemblies might provide a more stable structure for attaching such features.

Figure 8:
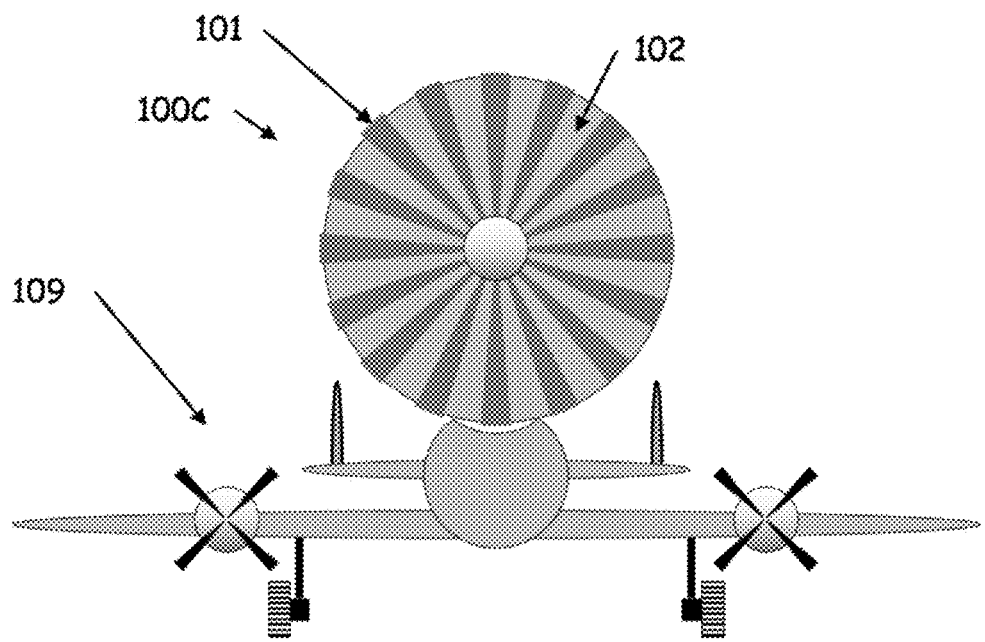
FIG. 8 is a front view showing the CBAG airship at maximum buoyancy combined with a heavier-than-air fixed wing aircraft.
Figure 9:
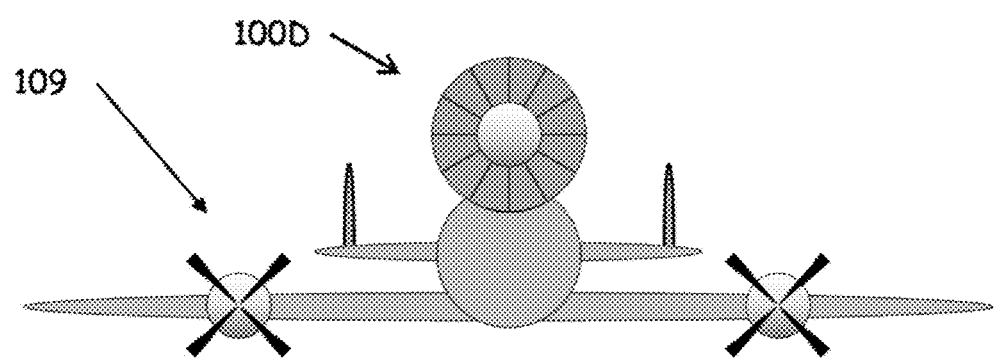
FIG. 9 is a front view showing the CBAG airship at minimum buoyancy combined with a heavier-than-air fixed wing aircraft.

While the CBAG airship could certainly be fitted with its own attached wings, fins, propulsion, control, and navigation systems, etc., its greatest advantages would be realized when combined with a custom designed heavier-than-air structure to form a hybrid aircraft using wings or rotors. FIG. 8 shows a front view of the CBAG airship at maximum buoyancy and geometry 100C combined with a winged aircraft 109. FIG. 9 shows a front view of the CBAG airship at minimum buoyancy and geometry 100D combined with the same winged aircraft 109. With the CBAG airship configured for maximum buoyancy and geometry, a winged hybrid aircraft would be able to take off vertically, start flying forward, gradually accelerate to a very high speed as the wings gradually provided more lift and the CBAG airship gradually transitioned to minimum buoyancy. Upon reaching its destination, the hybrid could gradually slow down as the CBAG gradually transitioned to high buoyancy and geometry, allowing the hybrid to come to a full stop above its destination and descend vertically. The winged structure could be slung under the CBAG, suspended either from the ribs, or from the nose and tail assemblies. The whole under-slung structure could be moved slightly forward or backward to trim the pitch angle of the combined hybrid craft. For a large transport system, two or more CBAG airships could be combined with a heavier-than-air structure. For an electric powered craft, wings could be fitted with solar panels. Whenever the CBAG airship is configured as a hybrid, the heavier-than-air structure must be able to supply power to operate the tensioning mechanism and the cryogenic system.

Figure 10:
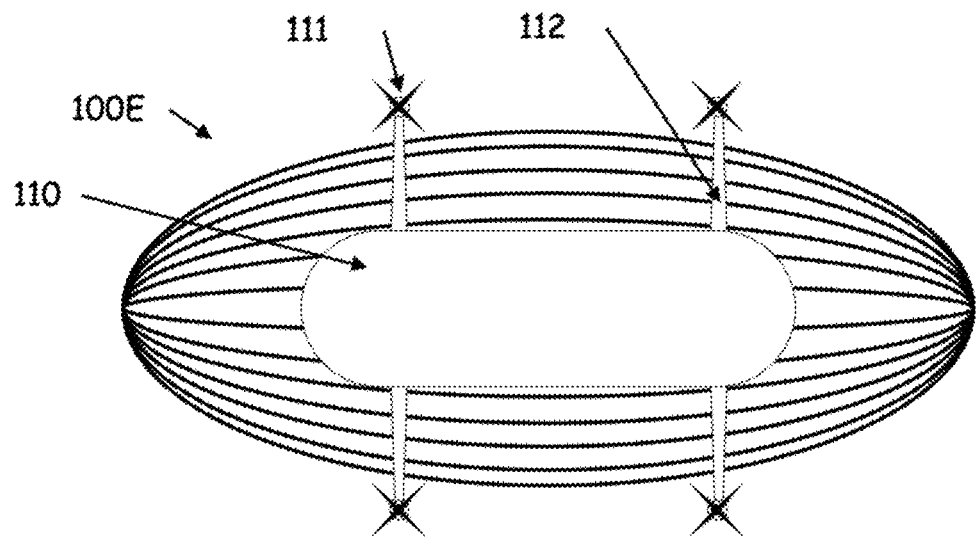
FIG. 10 is a bottom view showing the CBAG airship at maximum buoyancy combined with a heavier-than-air quadcopter.
Figure 11:
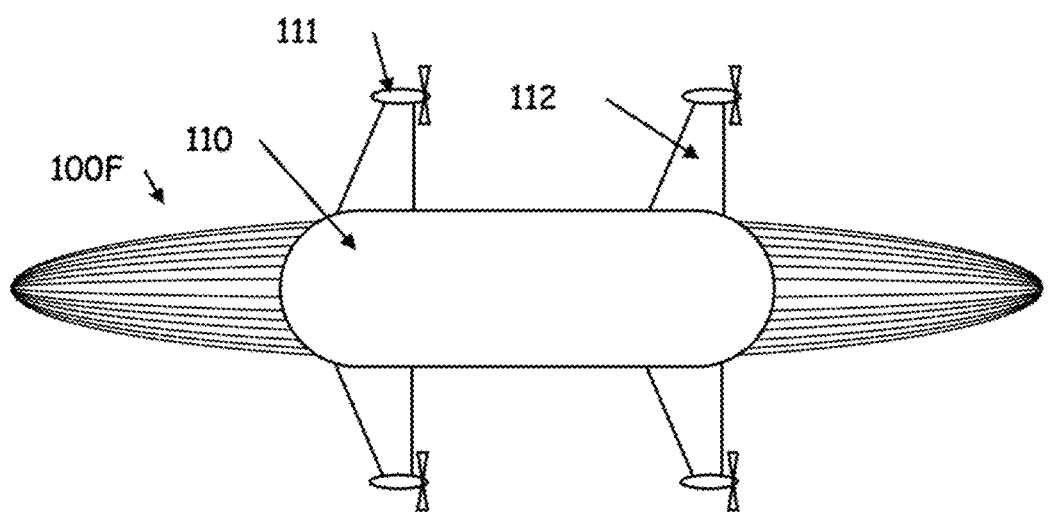
FIG. 11 is a bottom view showing the CBAG airship at minimum buoyancy combined with a heavier-than-air quadcopter.

FIG. 10 shows the bottom view of a CBAG Airship adjusted for maximum buoyancy and geometry 100E mounted above a quadcopter 110 in a hybrid arrangement with the rotors 111 angled for vertical motion. FIG. 11 shows the bottom view of a CBAG Airship adjusted for minimum buoyancy and geometry 100F mounted above the same quadcopter 110 in a hybrid arrangement with rotors 111 mounted on rotatable winglets 112 angled for forward motion. In the case of a quadcopter style hybrid aircraft, adding one or more CBAG Airships would make it possible for such a craft to stay aloft much longer, as power would only be needed for changing position or station keeping, instead of for hovering. An electric powered craft with solar recharging could stay aloft almost indefinitely. Such a device could function as a cellphone or microwave relay station, or as a long-term reconnaissance drone.

In an alternate embodiment, though perhaps more complicated and less optimal, the ribs could be designed to inherently bow outward for maximum buoyancy with the lifting gas at close to atmospheric pressure, and they could be drawn inward along with the envelope by pumping gas out of the envelope and into a pressure storage tank, or by an internal mechanism acting directly on the ribs to draw them in.

I claim:

1. A "Configurable Buoyancy And Geometry" (hereinafter abbreviated CBAG) airship comprising
    a gas-tight envelope containing a partial fill of buoyant gas, said buoyant gas thus being at less than atmospheric pressure, said envelope being supported by a plurality of springy flexible longitudinal ribs arranged in a radial pattern about and bowed outwardly from a geometric center axis, said ribs having front ends fastened to a nose assembly and back ends fastened to a tail assembly, and
    a tensioning mechanism connected between said nose assembly and said tail assembly which can be adjusted to pull said nose assembly and said tail assembly closer together thus causing said ribs to bow further outward increasing said geometry and buoyancy of the CBAG airship toward a maximum, said tensioning mechanism which can also be adjusted to allow said nose assembly and said tail assembly to move further apart thus allowing said ribs to bow less outwardly decreasing said geometry and buoyancy to a minimum, each of said ribs comprising an outer shell and two inner shells, said outer shell having a first longitudinal edge with a longitudinal ridge thereon and a second longitudinal edge with a longitudinal groove therein such that when said geometry and buoyancy are adjusted to said minimum, said longitudinal ridge of each outer shell will mate with said longitudinal groove of an adjacent outer shell, thus completely enclosing said lightweight gas-tight envelope in a continuous outer shell, each of said inner shells being attached to said envelope and also to said outer shell.

2. The CBAG airship of claim 1 in which said tensioning mechanism is a motorized winch.

3. The CBAG airship of claim 1 in which said tensioning mechanism is a motorized jackscrew.

4. The CBAG airship of claim 1 in which said tensioning mechanism is a pneumatic actuator.

5. The CBAG airship of claim 1 in which said tensioning mechanism is a hydraulic actuator.

6. The CBAG airship of claim 1 which is uniquely capable of forming a feasible hybrid aircraft because when configured toward said maximum buoyancy and geometry it can take off and land vertically and when configured for said minimum geometry and buoyancy it can travel at very high speed.

* * * * *